United States Patent [19]

Babu et al.

[11] Patent Number: 5,266,399
[45] Date of Patent: Nov. 30, 1993

[54] PRESSURE-SENSITIVE ADHESIVE BASED ON ETHYLENICALLY-UNSATURATED α-OLEFIN POLYMER CURED WITH HYDROSILANE

[75] Inventors: Gaddam N. Babu, Woodbury; Larry D. Boardman, Shoreview, both of Minn.

[73] Assignee: Minnesota Mining and Manufacturing Company, St. Paul, Minn.

[21] Appl. No.: 9,868

[22] Filed: Jan. 26, 1993

Related U.S. Application Data

[62] Division of Ser. No. 605,653, Oct. 30, 1990, Pat. No. 5,194,501.

[51] Int. Cl.$^5$ ................................................. B32B 7/12
[52] U.S. Cl. .................................... 428/343; 428/352; 428/354; 428/511; 428/512; 428/515; 428/517; 428/521
[58] Field of Search ............... 428/343, 352, 354, 511, 428/512, 515, 517, 521

[56] References Cited

U.S. PATENT DOCUMENTS

| | | | |
|---|---|---|---|
| 3,542,717 | 11/1970 | Lipman | 260/27 |
| 3,635,755 | 1/1972 | Balinth et al. | 117/122 P |
| 3,954,697 | 5/1976 | McConnell et al. | 526/350 |
| 4,178,272 | 12/1979 | Meyer et al. | 260/27 R |
| 4,288,358 | 9/1981 | Trotter et al. | 260/31.8 M |
| 4,346,189 | 8/1982 | Laurent | 525/105 |
| 4,831,080 | 5/1989 | Blizzard et al. | 525/105 |
| 5,112,882 | 5/1992 | Babu et al. | 522/158 |

FOREIGN PATENT DOCUMENTS 1118327  7/1968  United Kingdom .

*Primary Examiner*—Bernard Lipman
*Attorney, Agent, or Firm*—Gary L. Griswold; Walter N. Kirn; Lorraine R. Sherman

[57] ABSTRACT

A pressure-sensitive adhesive that can adhere aggressively to both polar and nonpolar substrates and has good internal strength at high temperatures is provided by heat or radiation curing a blend of an ethylenically-unsaturated α-olefin polymer, a crosslinker having at least 2 hydrosilyl groups, and a hydrosilation catalyst. A preferred hydrosilane crosslinker has the formula

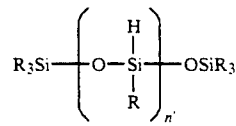

wherein R is an alkyl group having 1-6 carbon atoms, and n' is a number in the range of 2 to 35.

27 Claims, No Drawings

PRESSURE-SENSITIVE ADHESIVE BASED ON ETHYLENICALLY-UNSATURATED α-OLEFIN POLYMER CURED WITH HYDROSILANE

This is a division of application Ser. No. 07/605,653 filed Oct. 30, 1990 U.S. Pat. No. 5,194,501.

BACKGROUND OF THE INVENTION

1. Field of the Invention

The invention relates to pressure-sensitive adhesives that have good internal strength at high temperatures. The invention also relates to pressure-sensitive adhesives that can be coated without evolution of organic matter to provide tapes which are substantially odor-free and physiologically inert.

2. Description of the Related Art

When considering adhesive tapes, pressure-sensitive adhesive (PSA) tapes are the easiest to use, but for the most part, pressure-sensitive adhesives do not adhere well to nonpolar substrates. Another problem is that most PSAs are unsuited for uses requiring good internal strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Acrylate PSAs tend to give off toxic vapors at elevated temperatures. They typically contain monomeric materials which, even at ordinary room temperatures, exude odors that make acrylate PSA tapes generally unsuitable for medical uses. Polyisobutylene PSAs are often used for medical uses because they are physiologically inert, but they tend to be deficient in internal strength.

Of known PSAs, silicones best retain high internal strength at elevated temperatures, but known silicone PSAs must be coated from organic solvents. Typically, a metal catalyst is employed to initiate a reaction between gum and resin components, especially when good internal strength at elevated temperatures is required. Most effective are tin catalysts, the toxic nature of which prevents the resulting PSAs from being used in many important applications such as those involving food or medical needs. In spite of such problems and their high price, silicone PSA tapes are used where good internal strength at high temperatures is of utmost importance, e.g., as electrical insulating tapes and as masking tapes for use with paints to be baked at high temperatures.

PSAs can be based on α-olefin polymers. For example, U.S. Pat. No. 3,635,755 (Balinth et al.) describes PSAs made from homopolymers of $C_6$ to $C_{11}$ α-olefins or from interpolymers of $C_2$ to $C_{16}$ α-olefins. These tapes are said to show substantially no irritation to skin and to have low shear adhesions that facilitate non-irritating removal from human skin.

After noting that prior PSAs based on α-olefin polymers had very poor cohesive (internal) strength, U.S. Pat. No. 3,954,697 discloses that PSAs provided by copolymers of polypropylene and $C_6$ to $C_{10}$ α-olefins can be hot-melt coated at a melt temperature of at least 350° F. (177° C.) so that the copolymers exhibit no detectable crystallinity by either X-ray or DSC techniques. Nothing is said about cohesive strengths at elevated temperatures.

U.S. Pat. No. 4,288,358 (Trotter et al.) says that a PSA adhesive based on α-olefin polymers can be hot-melt coated and can have good resistance to shear adhesion failure, i.e., good internal strength. This is accomplished by blending at least one $C_6$ to $C_{10}$ linear α-olefin polymer with a plasticizing oil and a tackifying resin. Nothing is said about internal strength at elevated temperatures.

Another publication of PSAs based on α-olefin polymers is U.S. Pat. No. 3,542,717.

U.S. Pat. No. 4,178,272 discloses that a hot-melt adhesive which provides strong T-peel and lap shear bonds can be made using α-olefin polymers. The hot-melt adhesive disclosed in this reference is a blend of poly(propylene-co-higher 1-olefin), tackifying resin, and crystalline polypropylene. The blend is not said to be tacky or a PSA. In Example 1, the bonds are made at 200° C.

UK Pat. Specification No. 1,188,327 discloses a terpolymer of ethylene, propylene, and a di-unsaturated unconjugated olefin which can be crosslinked with an organopolysiloxane to provide an elastomer.

SUMMARY OF THE INVENTION

Briefly, the present invention provides a pressure-sensitive adhesive composition comprising a curable blend of (a) an α-olefin polymer containing ethylenic unsaturation, (b) a crosslinker having at least 2 hydrosilyl groups, and (c) a hydrosilation catalyst. The pressure-sensitive adhesive has good internal strength at elevated temperatures while avoiding the aforementioned problems. Because of this, the novel PSA can be useful for medical or surgical tapes, and automotive masking tapes and other tapes requiring good strength at elevated temperatures. The composition can be cured by heat or radiation.

Advantages of the novel PSA include
1) being odor-free,
2) being physiologically inert and hence non-allergenic, and
3) having the ability to adhere aggressively to both polar and nonpolar substrates.

Furthermore, large-scale production can produce the novel PSA and PSA tapes at costs comparable to that of any major PSA now on the market.

The PSA of the invention comprises a heat or radiation curable composition which is a PSA both before and after being cured.

In this application:

"alpha-olefin polymer" means a polymer prepared by polymerization of at least one alpha-olefin monomer;

"Ziegler-Natta (Z-N) catalyst" means a two-component coordination initiator or catalyst having the properties described by Seymour and Carraher, "Polymer Chemistry", Marcel Dekker, Inc., NY (1988) p. 296. The preferred catalyst systems are dialkyl aluminum chloride/titanium trichloride and dialkyl aluminum sesquichloride/vanadium oxytrichloride, which are commercially available.

DETAILED DESCRIPTION OF PREFERRED EMBODIMENTS

Preferably, the ethylenically-unsaturated α-olefin polymer of the PSA composition has the formula:

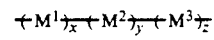   I wherein:

x, y, and z are numbers designating the relative molar amounts of $M^1$, $M^2$, and $M^3$ units that are randomly located in the backbone chain of the polymer such that the polymer has a weight average molecular weight in the range of 30,000 to 3.5 million, x is at least 60 mole % of x+y wherein y can be zero, and z is 0.1 to 10 mole % of x+y+z;

$M^1$ is an ethanediyl repeat unit having a pendent hydrocarbyl group having 4 to 12 carbon atoms;

$M^2$, when present, is different from $M^1$, and is an ethanediyl repeat unit selected from 1) ethylene, 2) units having a pendent hydrocarbyl group selected from linear and branched alkyl groups having 1 to 18 carbon atoms, cyclic alkyl groups and aryl groups having 5 to 18 carbon atoms, and 3) 1,2-cyclopentylene and 1,2-cyclohexylene groups having 5 to 18 carbon atoms; and $M^1$ is an ethanediyl repeat unit having a pendent ethylenically-unsaturated aliphatic or aryl group selected from the group consisting of 1) linear and branched mono- and polyethylenically-unsaturated hydrocarbyl groups having 3 to 18 carbon atoms, 2) cyclic mono- and polyethylenically-unsaturated aliphatic groups optionally containing at least one of oxygen and nitrogen heteroatoms, the groups having 5 to 18 carbon atoms, 3) aryl groups substituted by mono- or polyethylenically-unsaturated groups having a total of 7 to 18 carbon atoms, and 4) cycloalkenylene groups having 6 to 18 carbon atoms wherein the cyclic group has at least 6 carbon atoms in the ring, provided that the ethylenically-unsaturated (C=C) moiety is not bonded directly to a backbone carbon atom.

Most preferably, the ethylenically-unsaturated α-olefin random polymer has the formula:

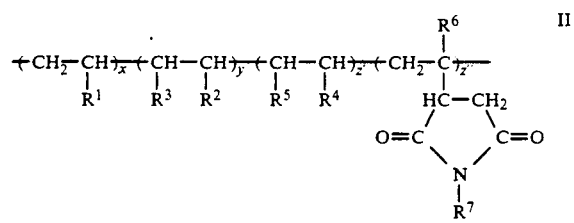

II wherein
- $R^1$ is an alkyl group having 4 to 12 carbon atoms, preferably 4 to 8 carbon atoms, and most preferably 4 to 6 carbon atoms;
- $R^2$ is hydrogen or a hydrocarbyl group, preferably selected from linear and branched alkyl groups having 1 to 18 carbon atoms, cyclic alkyl groups having 5 to 18 carbon atoms, and aryl groups having 6 to 12 carbon atoms;
- $R^3$ is hydrogen or $R^3$ together with $R^2$ and the carbon atoms to which they are attached forms a saturated monocyclic or polycyclic ring system having 5 to 20 carbon atoms, wherein at least 5 carbon atoms are in the ring system; preferably $R^3$ is hydrogen;
- x, y, z' and z'' are numbers designating the relative molar amounts of monomer units comprising the backbone chain of the polymer such that the polymer has a weight average molecular weight in the range of 30,000 to 3.5 million, x is at least 60% of x+y wherein y can be zero, and z'+z'' is 0.1 to 10% of x+y+z' and z'', and either of z' or z'' can be zero; z of Formula I equals the sum of z'+z'' of Formula II;
- $R^4$ is an unsaturated aliphatic hydrocarbyl group having 3 to 18 carbon atoms, the unsaturated group of which is separated from the

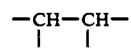

of the α-olefin polymer backbone by at least one carbon atom, preferably selected from linear and branched alkenyl groups having 3 to 18 carbon atoms, non-conjugated polyethylenically-unsaturated aliphatic groups having 6 to 18 carbon atoms, cyclic alkenyl groups having 5 to 18 carbon atoms, and cyclic non-conjugated polyethylenically-unsaturated groups having 6 to 18 carbon atoms;
- $R^5$ is hydrogen or $R^5$ together with $R^4$ and the carbon atoms to which they are attached forms an unsaturated or non-conjugated polyunsaturated monocyclic ring system having 6 to 20 carbon atoms, the unsaturated groups of which are separated from the

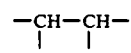

of the α-olefin polymer backbone by at least one carbon atom;
- $R^6$ is a linear or branched alkyl group having to 18 carbon atoms or cyclic alkyl group having 5 to 18 carbon atoms; and
- $R^7$ is a linear or branched ethylenically- or non-conjugated polyethylenically-unsaturated aliphatic hydrocarbon group having 3 to 18 carbon atoms, or a cyclic ethylenically or non-conjugated polyethylenically-unsaturated aliphatic hydrocarbyl group having 5 to 18 carbon atoms.

It is to be understood that the α-olefin polymers of the invention have terminating groups, the identity of which depends upon the catalyst and components in the polymerizing composition. The terminating groups, because of their insignificant concentration, do not affect the essential properties of the polymers.

When $R^1$ contains from 4 to 8 carbon atoms, the ethylenically-unsaturated α-olefin polymer is a tacky PSA at ordinary room temperatures (20° to 25° C.). When $R^1$ contains from 9 to 12 carbon atoms, the ethylenically-unsaturated α-olefin polymer is not normally tacky but becomes tacky when heated to moderately elevated temperatures (above 25° C. to 100° C.) and normally loses that tackiness when cooled to ambient temperature (20° to 25° C.). While tacky, it can form strong bonds under fingertip pressure. When $R^1$ contains from 9 to 12 carbon atoms and $R^2$ is an alkyl group of from 1 to 8 carbon atoms, the ethylenically-unsaturated α-olefin polymer may be slightly tacky at ordinary room temperatures. For some uses, the ability of a PSA to become tacky only when heated is an important advantage.

The preferred ratio of x and y groups to z groups is from 20:1 to 200:1 (0.5 to 5 mole %). As that ratio increases, the ethylenically-unsaturated α-olefin polymers have increased tackiness, but as that ratio decreases, they have increased internal strength. Hence, that ratio can be selected to afford the desired balance of tackiness and cohesive strength. For most uses, the best balance is attained when the ratio is between 30:1 and 100:1 (0.3 to 3.2 mole %). Tackiness can also be increased, or an otherwise non-tacky ethylenically-unsaturated α-olefin polymer of the invention can be made tacky, by blending it with tackifying resin.

Preferably, the ethylenically-unsaturated α-olefin polymer has a $T_g$ not higher than 0° C., more preferably not higher than −20° C., and its $T_g$ can be as low as −60° or −70° C. A PSA ethylenically-unsaturated α-olefin polymer that has a low $T_g$ tends to have superior adhesion. Furthermore, an ethylenically-unsaturated α-olefin polymer with a lower $T_g$ can be blended with larger amounts of tackifying resin to make coatings that exhibit less shocky peel adhesion.

The ethylenically-unsaturated α-olefin polymer has an inherent viscosity (IV) in toluene in the range of 0.5 to 5 dl/g, preferably in the range of 0.5 to 3 dl/g, which values roughly correspond to average molecular weights of from 50,000 to 10,000,000, preferably 50,000 to 3,500,000, respectively. At an IV substantially below that preferred range, the ethylenically-unsaturated α-olefin polymer can be less likely to attain high internal strength, especially at elevated temperatures. At viscosities substantially higher than 3 dl/g, the ethylenically-unsaturated α-olefin polymer preferably is coated from solution. At an IV above 5 dl/g, it may be necessary to employ a solution that is too dilute to be commercially practical.

Useful crosslinkers containing at least two hydrosilyl groups include:

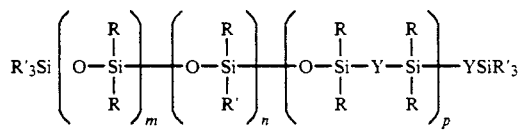

wherein
each R is an alkyl group having 1–6 carbon atoms or a phenyl group;
each R' is the same as R or hydrogen;
Y is oxygen, or an arylene group having 6 to 16 carbon atoms, an alkylene group having 2 to 16 carbon atoms, or (CF$_2$)$_d$ where d is an integer from 2 to 10;
each m, n and p is 0 or a number in the range of 1 to 35 designating the relative molar amount of m, n and p; and
at least two R' groups are hydrogen.
Specific classes of these crosslinkers are hydrosiloxanes (1) through (5)

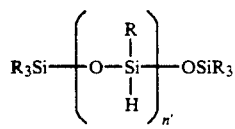

wherein n' is a number from 2 to 35, and R is as defined above, and preferably R is methyl;

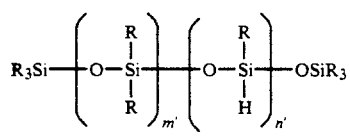

wherein m' is at least one, n' is a number from 2 to 35, and R is as defined above, and preferably R is methyl;

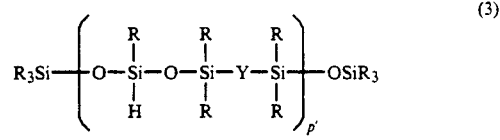

wherein p' is a number from 2 to 35, and R and Y are as defined above, and preferably R is methyl;

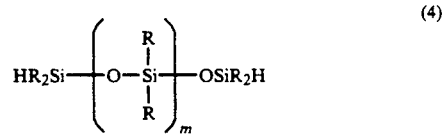

wherein m is 0 or a number up to 35, and R is as defined above, and preferably R is methyl; and

wherein R and Y are as defined above, and preferably R is methyl.

Other useful crosslinkers include silica particles having adsorbed onto their surfaces compounds having at least two dimethylhydrosilyl groups; e.g., compound (4) or (5) above can be adsorbed onto silica particles.

The preferred concentration of crosslinker (b), having at least 2 hydrosilyl groups, is in the range of 1–20 parts per hundred (phr) of ethylenically-unsaturated α-olefin polymer component (a), more preferably in the range of 1–10 phr, and most preferably in the range of 1–5 phr.

Hydrosilation catalysts are well-known in the art and include both thermal and photoactivated catalysts such as platinum complexes disclosed in U.S. Pat. Nos. 4,288,345 and 4,510,094, which are hereby incorporated by reference, and rhodium complexes disclosed in Faltynek, "Inorganic Chemistry", 20(5), pp. 1357–1362 (1981). Platinum complexes afford a faster reaction and hence are preferred. Useful platinum-containing catalysts include, for example, chloroplatinic acid,
chloroplatinic acid-olefin complexes,
chloroplatinic acid-vinylsiloxane complexes,
($\eta^5$-cyclopentadienyl)trimethylplatinum,
[$\eta^5$-(trimethylsilyl)cyclopentadienyl]trimethylplatinum, and
platinum(II) acetylacetonate.

The catalyst can be supported or coated on a microparticulate carrier such as alumina, silica or zirconia. The catalyst can be employed in an amount in the range from 0.1 to 1,000 ppm (parts per million of total ethylenically-unsaturated α-olefin polymer plus crosslinker), preferably from 1 to 300 ppm. At substantially less than 1 ppm, the novel PSA composition, after being heat or radiation cured, may not have good internal strength at elevated temperatures. At substantially greater than 300 ppm, thermal curing may render the PSA nontacky. When platinum-containing catalysts are used, because of the relatively high cost of a platinum-containing complex, it preferably is employed in the range of 1–100 ppm.

The ethylenically-unsaturated α-olefin polymer can be produced by the following methods. In a first method, a $C_6$ to $C_{14}$ α-olefin monomer is copolymerized with a nonconjugated linear diene having 5 to 20 carbon atoms or more, a monocyclic diene having 6 to 20 or more carbon atoms, or a polycyclic diene having 7 to 20 or more carbon atoms, using a Z—N catalyst to produce a copolymer containing ethylenic unsaturation. In the copolymer produced by this first method, $M^3$ of formula I, has, for example, structures such as III, IV and V (below) when the diene is linear, and VI, VII, and VIII (below) when the diene is cyclic,

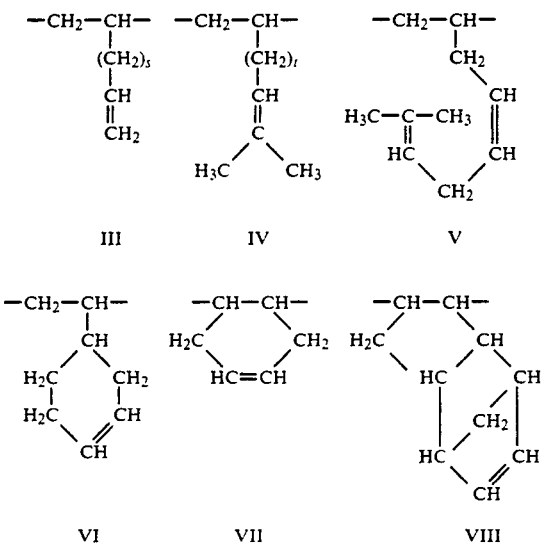

wherein s is an integer from 1 to 16, preferably 2 to 4, and t is an integer from 1 to 14, preferably 2 to 4.

A second method involves the steps of:

a) polymerizing a $C_6$ to $C_{14}$ α-olefin monomer alone or with at least one lower α-olefin monomer using a Z—N catalyst to produce a saturate homopolymer or a copolymer, b) reacting the resulting α-olefin polymer with maleic anhydride in the presence of an initiator such as a peroxide and preferably an electron donor (e.g., triphenyl phosphite or triethyl phosphate) to produce an adduct, and c) reacting the maleated α-olefin polymer adduct with an ethylenically-unsaturated primary amine or isocyanate having 3 to 20 carbon atoms, either in solution or in a melt, e.g., in an extruder.

In the resulting α-olefin polymer, $M^3$ of Formula I has structures such as IX and X.

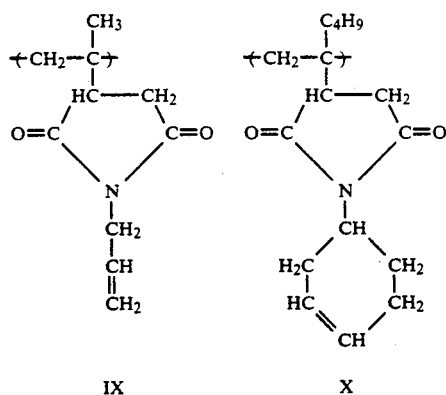

Alpha-olefins that can be used in the preparation of the ethylenically-unsaturated α-olefin polymer of the invention can have from 2 to 20 carbon atoms. Representative examples include, but are not limited to, ethylene, propylene, 1-butene, 1-pentene, 1-hexene, 1-heptene, 1-octene, and 1-tetradecene; branched olefins such as 3-methyl-1-butene, 3,3-dimethyl-1-butene, 4-methyl-1-pentene, and 3-ethyl-1-pentene; cyclic olefins such as cyclopentene, cyclohexene, 3-methylcyclopentene, 4-n-butylcyclohexene, bicyclo[2.2.1]hept-2-ene, 1,7,7-trimethylbicyclo[2.2.1]hept-2-ene (bornylene) bicyclo[3.2.0]hept-2-ene, bicyclo[3.2.0]hept-6-ene, bicyclo[2.2.2]oct-2-ene, and bicyclo[3.2.2]non-6-ene; and aromatic olefins such as allylbenzene, 1H-indene, 3-methyl-1H-indene, and styrene.

Non-conjugated dienes that can be used in the preparation of the α-olefin polymer of the invention have to 20 carbon atoms. Representative examples include, but are not limited to, 1,4-pentadiene, 1,5-hexadiene, 1,6-heptadiene, 1,7-octadiene, and 1,13-tetradecadiene; cyclic dienes such as 1,4-cyclohexadiene, bicyclo[2.2.1]hept-2,5-diene, bicyclo[2.2.2]oct-2,5-diene, bicyclo[2.2.2]oct-2,6-diene, 1,7,7-trimethylbicyclo[2.2.1]hept-2,5-diene, 5-allylbicyclo[2.2.1]hept-2-ene, and 1,5-cyclooctadiene; and aromatic dienes such as bis(ω-alkenyl)benzenes such as 1,4-diallylbenzene, and 4-allyl-1H-indene.

The novel PSA preferably includes a tackifying resin which imparts tack, lower viscosity, improved coatabilty, good heat stability, and improved peel adhesion. Compatible tackifying resins include resins derived from polyterpenes, synthetic polyterpenes and the like. Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring softening points of from about 80° C. to about 145° C., acid numbers from about 0 to 2, and saponification values of less than one. Examples of such commercially available tackifying resins based on a $C_5$ olefin fraction of this type are Wingtack ™ 95 and Wingtack ™ 115 available from Goodyear Tire and Rubber Co. Other useful hydrocarbon tackifying resins include Regalrez ™ 1078 and Regalrez ™ 1126 hydrocarbon tackifiers available from Hercules Chemical Co., Inc.

The tackifying resins may contain ethylenic unsaturation, but saturated tackifying resins are preferred for those applications where oxidation resistance is important. The total amount of tackifying resin in the novel PSA composition is from 0 to 150 parts, more preferably 5 to 50 parts, and most preferably 10 to 35 parts by weight per 100 parts of the ethylenically-unsaturated α-olefin polymer.

The novel PSA composition may also include small quantities of other materials commonly employed in PSA compositions, e.g., supplementary antioxidants, pigments, inhibitors, stabilizers, and fillers. Preferably, the total amount of such other materials does not exceed 4 phr.

The PSA composition of the invention can be coated onto a wide range of substrate materials, examples being polymer films such as biaxially oriented poly(ethyleneterephthlate) (PET) and biaxially oriented polypropylene (BOPP); woven and non-woven fabrics; metals and metal foils such as aluminum, copper, lead, and gold; glass; ceramics; and composite materials comprised of laminates of one or more of these materials.

The PSA of this invention is typically prepared by blending components in any order employing conventional mixing apparatus.

The novel PSA of the invention can be used as a transfer tape. Such a tape comprises a support (flexible backing) having coated on at least one surface thereof a release coating (e.g., silicone, acrylate, urethane, or epoxy material) as is known in the art, the release coating being overcoated with a layer of PSA according to the present invention.

The novel PSA can be used in combination with conventional PSAs (preferably a polar PSA) to afford exceedingly strong bonds between plastics and metals. For such uses, an acrylate or other conventional PSA can be coated onto a release liner and a layer of the novel PSA can be coated onto the conventional PSA coating. The exposed face of the resulting double-coated transfer tape can be adhered to a nonpolar support such as a polyolefin, polypropylene, or polyethylene plastic auto body side molding. Then after stripping off the liner, the conventional PSA coating can bond to metal to provide, for example, the body side molding of a painted automobile. In another embodiment, the layers of conventional and novel PSAs can be reversed in position. In another embodiment, a desirable result can be achieved by applying layers of the novel PSA and conventional PSA to opposite sides of a flexible carrier film which becomes part of the final assembly.

TEST METHODS

The test procedures used in the examples to evaluate and compare the properties of the PSA compositions and tapes made from them are industry standard tests. These tests are described in detail in various publications of the American Society for Testing Materials (ASTM), Philadelphia, Pa. and the Pressure Sensitive Tape Council (PSTC), Glenview, Ill. References to these standards are also given.

SHEAR STRENGTH (ASTM D-3654-78; PSTC - 7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under the stress of a constant, standard load.

The tests were conducted on adhesive coated strips applied to a stainless steel panel such that a 12.7 mm by 12.7 mm portion of each strip was in firm contact with the panel with one end portion of the tape being free. The panel with coated strip attached was held in a rack such that the exposed face of the backing of the strip formed an angle of 182° at the edge of the panel when a 1 kg mass was applied as a hanging weight from the free end of the coated strip. The 2° greater than 180° was used to negate peel forces, thus ensuring that only the shear forces were measured to determine the holding power of the tape being tested. The time elapsed for each test specimen to separate, i.e., fall, from the steel panel was recorded as the shear strength.

The time at which the mass fell (average of two specimens) was called "Shear at RT" (when measured at room temperature) or "Shear at 70° C." (when measured at 70° C.). When reported as "1000+", the tape had not failed after minutes. The mode of failure was indicated as follows:

pp = pop-off, i.e., 75–100% adhesive failure from steel plate sp = adhesive split leaving greater than 25% residue on each surface The pop-off failure mode was indicative of adhesive failure of the adhesive/steel interfacial bond as opposed to cohesive failure of the adhesive.

PEEL VALUE [ASTM D 3330-78; PSTC - 1 (11/75)]

The peel adhesion was the force required to remove a PSA coated test specimen from a test panel measured at a specific angle and rate of removal. In the examples, this force was expressed in Newtons per decimeter width (N/dm) of coated sheet. The procedure followed was:

1) A test specimen 12.7 mm wide was applied to a horizontally positioned clean glass test plate. A 2.2 kg rubber roller was used to press a 12.7 cm length of specimen into firm contact with the glass surface.
2) The free end of the specimen was doubled back nearly touching itself so the angle of removal was 180°. The free end was attached to the adhesion tester scale.
3) The glass test plate was clamped in the jaws of tensile testing machine which moved the plate away from the scale at a constant rate of 2.3 meters per minute.
4) The scale reading in Newtons ("Peel Value") was recorded as the tape is peeled from the glass surface.

EXTRACTABLES

A square test specimen containing 0.4±0.01 g of PSA was cut from a tape and placed in a 120-mesh stainless steel basket measuring approximately 4×8 cm. The contents were weighed to the nearest 0.1 mg and then immersed in a capped beaker containing sufficient toluene to cover the specimen. After extraction for 24 to 48 hours, the basket (containing the specimen) was removed, drained, and placed in a vacuum oven at 60° C. The basket and specimen were dried to a constant weight, and the % extractables were determined as follows:

$$\% \text{ Extractables} = \frac{\text{wt. lost during extraction}}{\text{wt. of original specimen}} \times 100$$

For the tackified pressure-sensitive adhesive tapes, the weight of the resin was subtracted before calculating the corrected % extractables as follows:

$$\% \text{ Extractables} = \frac{\text{wt. lost during extraction}}{\text{wt. of original specimen} - \text{wt. of resin}} \times 100$$

Two specimens of each tape were tested and average values are reported.

This invention will be further illustrated by the following examples, although it will be understood that these examples are included merely for purposes of illustration and are not intended to limit the scope of the invention. Unless otherwise indicated, all parts are by weight.

EXAMPLE 1

A PSA composition of 99.5 parts of 1-hexene-co-1,7-octadiene copolymer (98:2 mole ratio), part (a), 0.5 part of the above-identified hydrosiloxane crosslinker (1) wherein n=35, (part b), and 1.25 parts of 2-ethylhexyl maleate, an inhibitor, included to prevent the room temperature cure of the composition, were dissolved in 300 parts of toluene. A pressure-sensitive adhesive composition (approximately 33% nonvolatiles) was obtained by adding bis(divinyltetramethyldisiloxane)-platinum(O) as a thermal hydrosilation catalyst, part (c), to this mixture in an amount sufficient to give 100 ppm of platinum based on the combined quantity of polyolefin and siloxane. The polymer solution was then coated on biaxially oriented poly(ethyleneterephthate) backing using a hand spread coater (dry coating weight was 3.8 mg/sq cm). The solvent was evaporated at room temperature, and the hand spread was heated at 150° C. for 5 minutes to ensure complete cure (probably curing for one minute at that temperature would be sufficient).

The resulting tape had a "Peel Value" of 9 N/dm on glass and a "Shear at RT" of 52 min. with the mode of failure being pop-off. Extractables were less than 5 percent. A control tape was made in a similar manner, except omitting the hydrosiloxane crosslinker and inhibitor and the heating step. The control tape had a "Peel Value" of 16 N/dm and a "Shear at RT" of 1 min. with adhesive split.

EXAMPLES 2-5

Four PSA tapes were made in the same way as that of Example 1, except the PSA composition was modified as indicated in Table I which also reports test results.

EXAMPLE 6

To the polymer solution prepared in Example 1 was added 33 phr (parts per hundred parts of polyolefin) of Wingtack TM 115 tackifying resin and 50 ppm of the platinum catalyst of Example 1 (based on the combined weight of the adhesive and the crosslinker). A tape was cured as in Example 1. The cured tape had a "Peel Value" of 16 N/dm and a "Shear at RT" of 239 min. with pop-off failure as compared to an uncured tape which had a "Peel Value" of 65 N/dm and a "Shear at RT" of about 9 min. with cohesive failure. The percentage extractables after correcting for the resin was less than 3 percent.

EXAMPLES 7-16

A series of PSA tapes were made in the same way as that of Example 6, except the PSA composition was as indicated in Table I, which indicates that in some of the tapes the amount of tackifying resin was varied, and in some cases the tackifying resin was changed to Regalrez TM 1126 tackifying resin. The test data show a significant increase in the internal strength (shear) of the adhesive when the amount of tackifying resin was increased with the mode of failure being pop-off. PSA compositions having peel values in the range of 3 to 29 N/dm can be useful in tapes such as for medical or surgical applications and in insulating tapes.

COMPARATIVE EXAMPLES C-1 through C-5

A series of tapes were made as in Examples 1-16, except the composition was modified by omitting the hydrosilane crosslinker and platinum catalyst and adjusting the tackifying resin as indicated in Table I. The test data show that the uncrosslinked adhesives have poor internal strength (shear).

TABLE I

| Ex. | Polymer system (%) | Tackifier (phr) | Crosslinker (%) | Pt catalyst (ppm) | Peel value (N/dm) | Shear (min) | at RT (MOF) |
|---|---|---|---|---|---|---|---|
| 1 | 99.5 | — | 0.5 | 10 | 9 | 52 | pp |
| 2 | 99.5 | — | 0.5 | 50 | 6 | 98 | pp |
| 3 | 99.5 | — | 0.5 | 100 | 3 | 114 | pp |
| 4 | 99.8 | — | 0.2 | 50 | 8 | 198 | pp |
| 5 | 99.8 | — | 0.2 | 100 | 6 | 240 | sp |
| 6 | 99.5 | A(18) | 0.5 | 50 | 16 | 239 | pp |
| 7 | 99.5 | A(18) | 0.5 | 100 | 24 | 265 | pp |
| 8 | 99.9 | A(18) | 0.1 | 100 | 29 | 106 | pp |
| 9 | 99.5 | A(33) | 0.5 | 10 | 15 | 544 | pp |
| 10 | 99.5 | A(33) | 0.5 | 50 | 11 | 283 | pp |
| 11 | 99.5 | A(33) | 0.5 | 100 | 9 | 1957 | pp |
| 12 | 99.5 | B(33) | 0.5 | 50 | 15 | 1768 | pp |
| 13 | 99.5 | B(33) | 0.5 | 100 | 9 | 3800 | |
| 14 | 99.5 | B(33) | 0.5 | 50 | 27 | 1786 | pp |
| 15 | 99.5 | B(33) | 0.5 | 100 | 24 | 805 | pp |
| 16 | 99.1 | B(33) | 0.1 | 50 | 23 | 2844 | |
| C-1 | 100 | — | — | — | 28 | 6 | sp |
| C-2 | 100 | A(18) | — | — | 55 | 5 | sp |
| C-3 | 100 | A(33) | — | — | 65 | 9 | sp |
| C-4 | 100 | B(18) | — | — | 51 | 10 | sp |

TABLE I-continued

| Ex. | Polymer system (%) | Tacki- fier (phr) | Cross- linker (%) | Pt catalyst (ppm) | Peel value (N/dm) | Shear (min) | at RT (MOF) |
|---|---|---|---|---|---|---|---|
| C-5 | 100 | B(33) | — | — | 62 | 8 | sp |

A = Wingtack ™ 115 tackifing resin
B = Regalrez ™ 1126 tackifing resin
MOF = mode of failure
pp = pop-off (adhesive failure)
sp = split (cohesive failure)

EXAMPLES 17-22

A series of PSA tapes were made using the procedure and materials of Examples 1-16, except the starting α-olefin copolymer was 1-octene-co-1,7-octadiene (97:3 mole ratio). See Table II.

COMPARATIVE EXAMPLES C-6 to C-9

Four PSA tapes were made as in Examples 17-23 except the PSA composition was modified by omitting the hydrosilane crosslinker and platinum catalyst (see Table II, below).

EXAMPLE 23

Into 150 ml of toluene was dissolved 23.0 g of 1.2 mole % maleated 60 hexene-co-40 propylene copolymer that had been prepared as described for Polymer No. 12 in copending patent application U.S. Ser. No. 07/585,227 by the reaction of 60 hexene-co-40 propylene copolymer with maleic anhydride. The solution was refluxed under nitrogen, distilling off about 20 ml of toluene to ensure removal of water, and 0.23 g of allyl isocyanate was added. Refluxing was then continued for three hours. Spectral analysis confirmed the fact that the resulting polymer had essentially the structure of formula II in which $R^1$ was $C_4H_9$, $R^2$ was $CH_3$, $R^3$ was H, $R^6$ was $CH_3$, $R^7$ was allyl, x was about 450, y was about 290, z' was zero, and z" was about 8.9.

The maleated solution was reduced in volume to a coatable viscosity, and crosslinker, catalyst and stabilizer were added as described in Example 1. The polymer solution was then coated, dried, cured and evaluated as described in Example 1. The results are given in Table II.

TABLE II

| Ex. | Polymer system (%) | Tacki- fier (phr) | Cross- linker (%) | Pt catalyst (ppm) | Peel value (N/dm) | Shear (min) | at RT (MOF) |
|---|---|---|---|---|---|---|---|
| 17 | 99.5 | — | 0.5 | 50 | 7 | 1 | pp |
| 18 | 99.5 | — | 0.5 | 100 | 4 | 3 | pp |
| 19 | 99.5 | A(33) | 0.5 | 10 | 16 | 17 | pp |
| 20 | 99.5 | A(33) | 0.5 | 100 | 34 | 17 | pp |
| 21 | 99.5 | B(33) | 0.5 | 10 | 15 | 110 | pp |
| 22 | 99.5 | B(33) | 0.5 | 100 | 28 | 120 | pp |
| 23 | 99.5 | — | 0.5 | 100 | 32 | 600+ | — |
| C-6 | 100 | — | — | — | 15 | <1 | sp |
| C-7 | 100 | A(33) | — | — | 80 | 1 | sp |
| C-8 | 100 | B(33) | — | — | 77 | 2 | sp |
| C-9 | 100 | — | — | — | 65 | 240 | sp |

The data show that PSA tapes of Examples 17-23 are superior to the comparatives, particularly in the mode of failure. The PSA of the comparative tapes failed cohesively, whereas the PSA of the tapes of the invention had greater internal strength.

EXAMPLES 24-34

A series of PSA tapes were prepared as described in Example 1, except that 1-hexene-co-1,7-octadiene (97:3 mole ratio) copolymer was used as part (a), 0.5 to 2.2 percent of a crosslinker defined in Table III was used as part (b), and 100 ppm of a photoactive hydrosilation catalyst identified in Table III was used as part (c), and the coated substrate was cured by exposing it to UV radiation (300 mJ/cm²) followed by heating at 100° C. for 2 min. Peel and RT Shear data obtained for each tape are recorded in Table III.

Shear values varied considerably depending on the choice of crosslinker, catalyst and tackifier. The tape of Ex. 33, in which crosslinker (4), where R is methyl and m is 18, the catalyst [$\eta^5$-(trimethylsilyl)cyclopentadienyl]trimethylplatinum and Regalrez ™ 1126 tackifier were used, has a shear value of 9344 minutes, while the tape of Ex. 27, in which crosslinker (1), where n' is 35 and R is methyl, the catalyst platinum(II) acetylacetonate, and Regalrez ™ 1126 tackifying resin were used, had a shear value of only 900 minutes. Some combinations of crosslinker and catalyst, however, had good shear values, e.g., 1005 minutes (Ex. 32), even without tackifying resin.

TABLE III

| | PSA composition (parts) | | | | | | |
|---|---|---|---|---|---|---|---|
| Ex. | (a) Co- Polymer (%) | (b) Cross- linker[a] (%) | (c) Catalyst[b] (100 ppm) | Tack- ifier[c] (33 phr) | Peel (N/dm) | Shear (min) | MOF[d] |
| 24 | 100 | 0 | 0 | 0 | 47 | 6 | cf |
| 25 | 100 | 0 | 0 | A | 73 | 16 | cf |
| 26 | 99.5 | D(0.5) | I | B | 4 | 1318 | pp |
| 27 | 99.5 | D(0.5) | J | B | 1 | 900 | pp |
| 28 | 98.1 | E(1.9) | H | 0 | 36 | 8 | pp |

TABLE III-continued

| | PSA composition (parts) | | | | | | |
|---|---|---|---|---|---|---|---|
| Ex. | (a) Co-Polymer (%) | (b) Cross-linker[a] (%) | (c) Catalyst[b] (100 ppm) | Tack-ifier[c] (33 phr) | Peel (N/dm) | Shear (min) | MOF[d] |
| 29 | 98.1 | E(1.9) | I | B | 52 | 1185 | cf |
| 30 | 98.1 | E(1.9) | I | C | 34 | 2165 | cf |
| 31 | 98.1 | E(1.9) | J | C | 27 | 6008 | cf |
| 32 | 98.9 | F(1.1) | H | 0 | 26 | 1005 | pp |
| 33 | 98.9 | F(1.1) | I | B | 54 | 9344 | pwr |
| 34 | 97.8 | G(2.2) | J | B | 17 | 5478 | cf |

[a]D is crosslinker (1) where n' is 35 and R is methyl
[a]E is crosslinker (3) where Y is 1,4-phenylene, R is methyl, and p is 9
[a]F is crosslinker (4) where R is methyl and m is 18
[a]G is corsslinker (5) where Y is phenyleneoxyphenylene and R is methyl
[b]catalyst H is ($\eta^5$-cyclopentadienyl)trimethylplatinum
[b]catalyst I is [$\eta^5$-(trimethylsilyl)cyclopentadienyl]-trimethylplatinum
[b]catalyst J is platinum (II) acetylacetonate
[c]Tackifier A is Wingtack ™ 115 tackifier resin
[c]Tackifier B is Regalrez ™ 1126 tackifier resin
[c]Tackifier C is Arkon ™ tackifier resin
[d]MOF is mode of failure: cf is cohesive failure, pp is pop-off, and pwr is pop-off with residue Various modifications and alterations of this invention will become apparent to those skilled in the art without departing from the scope and spirit of this invention, and it should be understood that this invention is not to be unduly limited to the illustrative embodiments set forth herein.

What is claimed is:

1. A pressure-sensitive adhesive tape comprising a flexible backing bearing on at least one surface thereof a layer of a pressure-sensitive adhesive comprising a curable blend of an ethylenically-unsaturated α-olefin polymer, a crosslinker having at least 2 hydrosilyl groups, and hydrosilation catalyst, wherein said ethylenically-unsaturated α-olefin polymer has the formula:

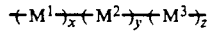

wherein:
x, y, and z are numbers designating the relative molar amounts of $M^1$, $M^2$, and $M^3$ units that are randomly located in the backbone chain of the polymer such that the polymer has a weight average molecular weight in the range of 30,000 to 3.5 million, x is at least 60 mole % of x+y wherein y can be zero, and z is 0.1 to 10 mole % of x+y+z;

$M^1$ is an ethanediyl repeat unit of the polymer each having at least one pendant alkyl group having 4 to 12 carbon atoms;

$M^2$, when present, is different from $M^1$, and is an ethanediyl repeat unit selected from 1) ethylene, 2) units having a pendant hydrocarbyl group selected from linear or branched alkyl groups having 1 to 18 carbon atoms, and cyclic and aryl pendant groups having 5 to 18 carbon atoms, and 3) 1,2-cyclopentylene and 1,2-cyclohexylene groups having 5 to 18 carbon atoms; and $M^3$ is an ethanediyl repeat unit having a pendant ethylenically unsaturated aliphatic or aryl groups selected from the group consisting of 1) linear and branched mono- and polyethylenically unsaturated hydrocarbyl groups having 3 to 18 carbon atoms, 2) cyclic mono- and polyethylenically-unsaturated aliphatic groups having 5 to 18 carbon atoms, 3) aryl groups substituted by mono- or polyethylenically-unsaturated groups having a total of 7 to 18 carbon atoms, and 4) cycloalkenylene groups having 6 to 18 carbon atoms, wherein the cyclic group has at least 6 carbon atoms in the ring, provided that the ethylenically-unsaturated moiety

is not bonded directly to a backbone carbon atom.

2. The pressure-sensitive adhesive tape of claim 1, wherein the adhesive layer has been heat cured.

3. The pressure-sensitive adhesive tape of claim 1, wherein the adhesive layer has been radiation cured.

4. A transfer tape comprising a support having coated on at least one surface thereof a release coating being overcoated with a layer of a pressure-sensitive adhesive comprising a curable blend of an ethylenically-unsaturated α-olefin polymer, a crosslinker having at least 2 hydrosilyl groups, and hydrosilation catalyst, wherein said ethylenically-unsaturated α-olefin polymer has the formula:

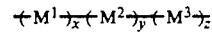

wherein:
x, y, and z are numbers designating the relative molar amounts of $M^1$, $M^2$, and $M^3$ units that are randomly located in the backbone chain of the polymer such that the polymer has a weight average molecular weight in the range of 30,000 to 3.5 million, x is at least 60 mole % of x+y wherein y can be zero, and z is 0.1 to 10 mole % of x+y+z;

$M^1$ is an ethanediyl repeat unit of the polymer each having at least one pendant alkyl group having 4 to 12 carbon atoms;

$M^2$, when present, is different from $M^1$, and is an ethanediyl repeat unit selected from 1) ethylene, 2) units having a pendant hydrocarbyl group selected from linear or branched alkyl groups having 1 to 18 carbon atoms, and cyclic and aryl pendant groups having 5 to 18 carbon atoms, and 3) 1,2-cyclopentylene and 1,2-cyclohexylene groups having 5 to 18 carbon atoms; and $M^3$ is an ethanediyl repeat unit having a pendant ethylenically unsaturated aliphatic or aryl group selected from the group consisting of 1) linear and branched mono- and polyethylenically unsaturated hydrocarbyl groups having 3 to 18 carbon atoms, 2) cyclic mono- and polyethylenically-unsaturated aliphatic groups having 5 to 18 carbon atoms, 3) aryl groups substituted by mono- or polyethylenically-unsaturated groups having a total of 7 to 18 carbon atoms, and 4) cycloalkylene groups having 6 to 18 carbon atoms, wherein the cyclic group has at least 6 carbon atoms in the ring, provided that the ethylenically-unsaturated moiety

is not bonded directly to a backbone carbon atom.

5. A transfer tape comprising a support having coated on at least one surface thereof a release coating, said release coating being overcoated in either order with a layer of a conventional pressure-sensitive adhesive and a layer of a pressure-sensitive adhesive comprising a curable blend of an ethylenically-unsaturated α-olefin polymer, a crosslinker having at least 2 hydrosilyl groups, and hydrosilation catalyst, wherein said ethylenically-unsaturated α-olefin polymer has the formula:

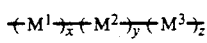

wherein:
x, y, and z are numbers designating the relative molar amounts of $M^1$, $M^2$, and $M^3$ units that are randomly located in the backbone chain of the polymer such that the polymer has a weight average molecular weight in the range of 30,000 to 3.5 million, x is at least 60 mole % of x+y wherein y can be zero, and z is 0.1 to 10 mole % of x+y+z;
$M^1$ is an ethanediyl repeat unit of the polymer each having at least one pendant alkyl group having 4 to 12 carbon atoms;
$M^2$, when present, is different from $M^1$, and is an ethanediyl repeat unit selected from 1) ethylene, 2) units having a pendant hydrocarbyl group selected from linear or branched alkyl groups having 1 to 18 carbon atoms, and cyclic and aryl pendant groups having 5 to 18 carbon atoms, and 3) 1,2-cyclopentylene and 1,2-cyclohexylene groups having 5 to 18 carbon atoms; and
$M^3$ is an ethanediyl repeat unit having a pendant ethylenically unsaturated aliphatic or aryl group selected from the group consisting of 1) linear and branched mono- and polyethylenically unsaturated hydrocarbyl groups having 3 to 18 carbon atoms, 2) cyclic mono- and polyethylenically-unsaturated aliphatic groups having 5 to 18 carbon atoms, 3) aryl groups substituted by mono- or polyethylenically-unsaturated groups having a total of 7 to 18 carbon atoms, and 4) cycloalkylene groups having 6 to 18 carbon atoms, wherein the cyclic group has at least 6 carbon atoms in the ring, provided that the ethylenically-unsaturated moiety

is not bonded directly to a backbone carbon atom.

6. A tape comprising a support having coated on one surface thereof a layer of conventional pressure-sensitive adhesive and on the other surface a layer of pressure-sensitive adhesive comprising a curable blend of an ethylenically-unsaturated α-olefin polymer, a crosslinker having at least 2 hydrosilyl groups, and hydrosilation catalyst, wherein said ethylenically-unsaturated α-olefin polymer has the formula:

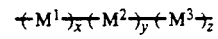

wherein:
x, y, and z are numbers designating the relative molar amounts of $M^1$, $M^2$, and $M^3$ units that are randomly located in the backbone chain of the polymer such that the polymer has a weight average molecular weight in the range of 30,000 to 3.5 million, x is at least 60 mole % of x+y wherein y can be zero, and z is 0.1 to 10 mole % of x+y+z;
$M^1$ is an ethanediyl repeat unit of the polymer each having at least one pendant alkyl group having 4 to 12 carbon atoms;
$M^2$, when present, is different from $M^1$, and is an ethanediyl repeat unit selected from 1) ethylene, 2) units having a pendant hydrocarbyl group selected from linear or branched alkyl groups having 1 to 18 carbon atoms, and cyclic and aryl pendant groups having 5 to 18 carbon atoms, and 3) 1,2-cyclopentylene and 1,2-cyclohexylene groups having 5 to 18 carbon atoms; and
$M^3$ is an ethanediyl repeat unit having a pendant ethylenically unsaturated aliphatic or aryl group selected from the group consisting of 1) linear and branched mono- and polyethylenically unsaturated hydrocarbyl groups having 3 to 18 carbon atoms, 2) cyclic mono- and polyethylenically-unsaturated aliphatic groups having 5 to 18 carbon atoms, 3) aryl groups substituted by mono- or polyethylenically-unsaturated groups having a total of 7 to 18 carbon atoms, and 4) cycloalkenylene groups having 6 to 18 carbon atoms, wherein the cyclic group has at least 6 carbon atoms in the ring, provided that the ethylenically-unsaturated moiety

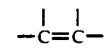

is not bonded directly to a backbone carbon atom.

7. The pressure-sensitive adhesive tape according to claim 1 wherein the ethylenically-unsaturated alpha-olefin polymer of said pressure-sensitive adhesive comprises units of the formula:

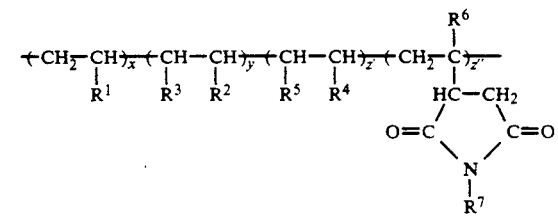

wherein
$R^1$ is an alkyl group having 4 to 12 carbon atoms;
$R^2$ is hydrogen or a hydrocarbyl group;
$R^3$ is hydrogen or $R^3$ together with $R^2$ and the carbon atoms to which they are attached is in a saturated monocyclic or polycyclic ring system having 5 to 20 carbon atoms, wherein at least 5 carbon atoms are in the ring system;

x, y, z' and z" are numbers designating the relative molar amounts of monomer units comprising the backbone chain of the polymer such that the polymer has a weight average molecular weight in the range of 30,000 to 3.5 million, x is at least 60% of x+y wherein y can be zero, z'+z" is 0.1 to 10% of x+y+z'+z", and either z' or z" can be zero;

$R^4$ is an unsaturated aliphatic hydrocarbyl group having 3 to 18 carbon atoms, the unsaturated group of which is separated from the —CH—CH— of the α-olefin polymer backbone by at least one carbon atom;

$R^6$ is hydrogen or $R^6$ together with $R^4$ and the carbon atoms to which they are attached is an unsaturated or non-conjugated polyunsaturated monocyclic ring system having 6 to 20 carbon atoms, the unsaturated groups of which are separated from the

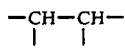

of the α-olefin polymer backbone by at least one carbon atom;

$R^6$ is a linear or branched alkyl group having 1 to 18 carbon atoms or a cyclic alkyl group having 5 to 18 carbon atoms; and $R^7$ is a linear or branched ethylenically or non-conjugated polyethylenically-unsaturated aliphatic hydrocarbyl group having 3 to 18 carbon atoms or a cyclic ethylenically or non-conjugated polyethylenically-unsaturated aliphatic hydrocarbyl group having 5 to 18 carbon atoms.

8. The transfer tape according to claim 4 wherein the ethylenically-unsaturated alpha-olefin polymer of said pressure-sensitive adhesive comprises units of the formula:

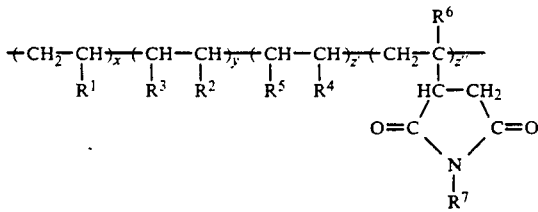

wherein:

$R^1$ is an alkyl group having 4 to 12 carbon atoms;

$R^2$ is hydrogen or a hydrocarbyl group;

$R^3$ is hydrogen or $R^3$ together with $R^2$ and the carbon atoms to which they are attached is in a saturated monocyclic or polycyclic ring system having 5 to 20 carbon atoms, wherein at least 5 carbon atoms are in the ring system;

x, y, z' and z" are numbers designating the relative molar amounts of monomer units comprising the backbone chain of the polymer such that the polymer has a weight average molecular weight in the range of 30,000 to 3.5 million, x is at least 60% of x+y wherein y can be zero, z'+z" is 0.1 to 10% of x+y+z'+z", and either z' or z" can be zero;

$R^4$ is an unsaturated aliphatic hydrocarbyl group having 3 to 18 carbon atoms, the unsaturated group of which is separated from the —CH—CH— of the α-olefin polymer backbone by at least one carbon atom;

$R^5$ is hydrogen or $R^5$ together with $R^4$ and the carbon atoms to which they are attached is an unsaturated or non-conjugated polyunsaturated monocyclic ring system having 6 to 20 carbon atoms, the unsaturated groups of which are separated from the

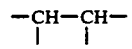

of the α-olefin polymer backbone by at least one carbon atom;

$R^6$ is a linear or branched alkyl group having 1 to 18 carbon atoms or a cyclic alkyl group having 5 to 18 carbon atoms; and $R^7$ is a linear or branched ethylenically or non-conjugated polyethylenically-unsaturated aliphatic hydrocarbyl group having 3 to 18 carbon atoms or a cyclic ethylenically or non-conjugated polyethylenically-unsaturated aliphatic hydrocarbyl group having 5 to 18 carbon atoms.

9. The transfer tape according to claim 5 wherein the ethylenically-unsaturated alpha-olefin polymer of said pressure-sensitive adhesive comprises units of the formula:

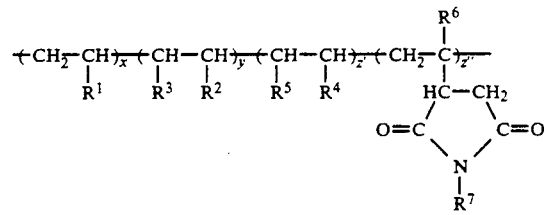

wherein $R^1$ is an alkyl group having 4 to 12 carbon atoms;

$R^2$ is hydrogen or a hydrocarbyl group;

$R^3$ is hydrogen or $R^3$ together with $R^2$ and the carbon atoms to which they are attached is in a saturated monocyclic or polycyclic ring system having 5 to 20 carbon atoms, wherein at least 5 carbon atoms are in the ring system;

x, y, z' and z" are numbers designating the relative molar amounts of monomer units comprising the backbone chain of the polymer such that the polymer has a weight average molecular weight in the range of 30,000 to 3.5 million, x is at least 60% of x+y wherein y can be zero, z'+z" is 0.1 to 10% of x+y+z'+z", and either z' or z" can be zero;

$R^4$ is an unsaturated aliphatic hydrocarbyl group having 3 to 18 carbon atoms, the unsaturated group of which is separated from the —CH—CH— of the α-olefin polymer backbone by at least one carbon atom;

$R^5$ is hydrogen or $R^5$ together with $R^4$ and the carbon atoms to which they are attached is an unsaturated or non-conjugated polyunsaturated monocyclic ring system having 6 to 20 carbon atoms, the unsaturated groups of which are separated from the

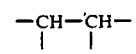

of the α-olefin polymer backbone by at least one carbon atom;

R⁶ is a linear or branched alkyl group having 1 to 18 carbon atoms or a cyclic alkyl group having 5 to 18 carbon atoms; and R⁷ is a linear or branched ethylenically or non-conjugated polyethylenically-unsaturated aliphatic hydrocarbyl group having 3 to 18 carbon atoms or a cyclic ethylenically or non-conjugated polyethylenically-unsaturated aliphatic hydrocarbyl group having 5 to 18 carbon atoms.

10. The tape according to claim 6 wherein the ethylenically-unsaturated alpha-olefin polymer of said pressure-sensitive adhesive comprises units of the formula:

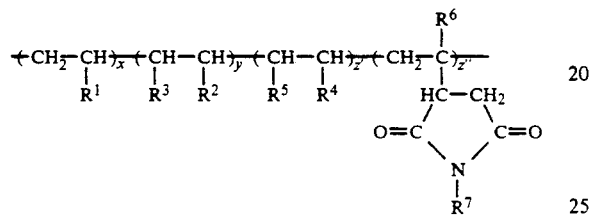

wherein

R¹ is an alkyl group having 4 to 12 carbon atoms;

R² is hydrogen or a hydrocarbyl group;

R³ is hydrogen or R³ together with R² and the carbon atoms to which they are attached is in a saturated monocyclic or polycyclic ring system having 5 to 20 carbon atoms, wherein at least 5 carbon atoms are in the ring system;

x, y, z' and z" are numbers designated the relative molar amounts of monomer units comprising the backbone chain of the polymer such that the polymer has a weight average molecular weight in the range of 30,000 to 3.5 million, x is at least 60% of x+y wherein y can be zero, z'+z" is 0.1 to 10% of x+y+z'+z", and either z' or z" can be zero;

R⁴ is an unsaturated aliphatic hydrocarbyl group having 3 to 18 carbon atoms, the unsaturated group of which is separated from the —CH—CH— of the α-olefin polymer backbone by at least one carbon atom;

R⁵ is hydrogen or R⁵ together with R⁴ and the carbon atoms to which they are attached is an unsaturated or non-conjugated polyunsaturated monocyclic ring system having 6 to 20 carbon atoms, the unsaturated groups of which are separated from the

of the α-olefin polymer backbone by at least one carbon atom;

R⁶ is a linear or branched alkyl group having 1 to 18 carbon atoms or a cyclic alkyl group having 5 to 18 carbon atoms; and R⁷ is a linear or branched ethylenically or non-conjugated polyethylenically-unsaturated aliphatic hydrocarbyl group having 3 to 18 carbon atoms or a cyclic ethylenically or non-conjugated polyethylenically-unsaturated aliphatic hydrocarbyl group having 5 to 18 carbon atoms.

11. The pressure-sensitive adhesive tape according to claim 1 wherein said crosslinker in said pressure sensitive adhesive is selected from the group consisting of

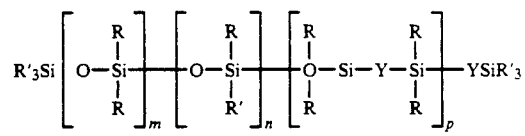

wherein each R is an alkyl group having 1–6 carbon atoms or a phenyl group, each R' is the same as R or hydrogen, Y is oxygen, an arylene group, an alkylene group, or $(CF_2)_d$ where d is an integer from 2 to 10, each m, n and p is 0 or a number in the range of 1 to 35, and at least two R' groups are hydrogen;

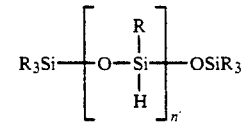

wherein n' is a number in the range of 2 to 35, and R is as defined above;

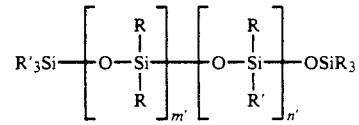

wherein m' is at least one, n' is a number in the range of 2 to 35, and R is as defined above;

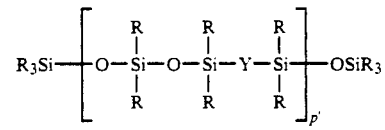

wherein p' is a number in the range of 2 to 35, and R and Y are as defined above;

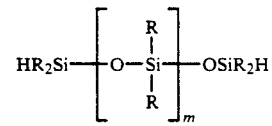

wherein m and R are as defined above; and

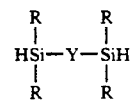

wherein R and Y are as defined above.

12. The transfer tape according to claim 4 wherein said crosslinker in said pressure-sensitive adhesive is selected from the group consisting of

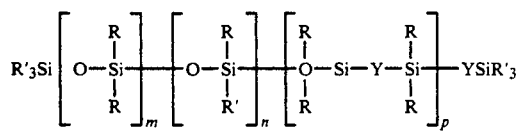

wherein
  each R is an alkyl group having 1-6 carbon atoms or a phenyl group,
  each R' is the same as R or hydrogen,
  Y is oxygen, an arylene group, an alkylene group, or $(CF_2)_d$ where d is an integer from 2 to 10,
  each m n and p is 0 or a number in the range of 1 to 35, and
  at least two R' groups are hydrogen;

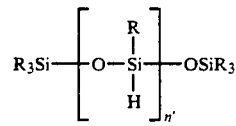

wherein n' is a number in the range of 2 to 35, and R is as defined above;

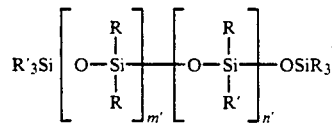

wherein m' is at least one, n' is a number in the range of 2 to 35, and R is as defined above;

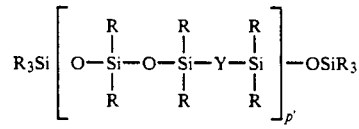

wherein p' is a number in the range of 2 to 35, and R and Y are as defined above;

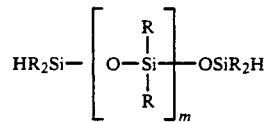

wherein m and R are as defined above; and

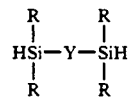

wherein R and Y are as defined above.

13. The transfer tape according to claim 5 wherein said crosslinker in said pressure-sensitive adhesive is selected from the group consisting of

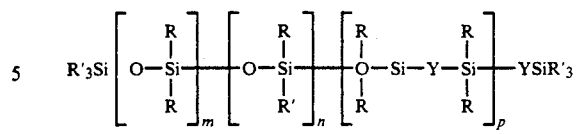

wherein
  each R is an alkyl group having 1-6 carbon atoms or a phenyl group,
  each R' is the same as R or hydrogen,
  Y is oxygen, an arylene group, an alkylene group, or $(CF_2)_d$ where d is an integer from 2 to 10.
  each m, n and p is 0 or a number in the range of 1 to 35, and
  at least two R' groups are hydrogen;

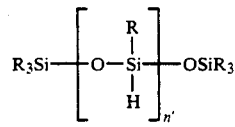

wherein n' is a number in the range of 2 to 35, and R is an defined above;

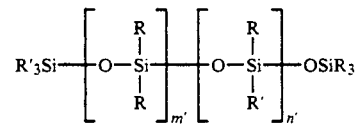

wherein m' is at least one, n' is a number in the range of 2 to 35, and R is as defined above;

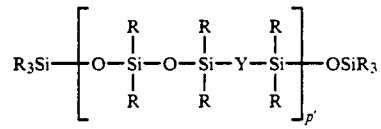

wherein p' is a number in the range of 2 to 35, and R and Y are as defined above;

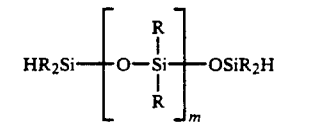

wherein m and R are as defined above; and

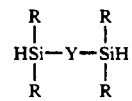

wherein R and Y are as defined above.

14. The tape according to claim 6 wherein said crosslinker in said pressure-sensitive adhesive is selected from the group consisting of

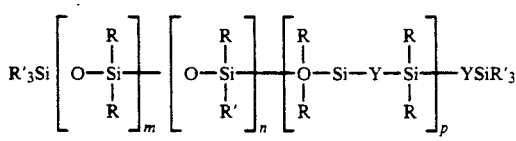

wherein
- each R is an alkyl group having 1–6 carbon atoms or a phenyl group,
- each R' is the same as R or hydrogen,
- Y is oxygen, an arylene group, an alkylene group, or $(CF_2)_d$ where d is an integer from 2 to 10,
- each m, n and p is 0 or a number in the range of 1 to 35, and
- at least two R' groups are hydrogen;

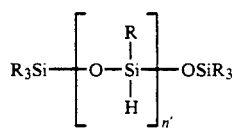

wherein n' is a number in the range of 2 to 35, and R is as defined above;

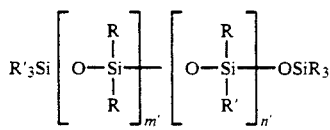

wherein m' is at least one, n' is a number in the range of 2 to 35, and R is as defined above;

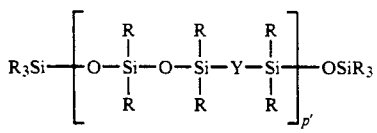

wherein p' is a number in the range of 2 to 35, and R and Y are as defined above;

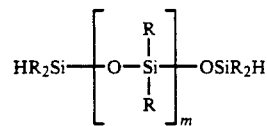

wherein m and R are as defined above; and

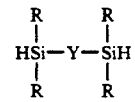

wherein R and Y are as defined above.

15. The pressure-sensitive adhesive tape according to claim 1 wherein said pressure-sensitive adhesive has been cured.

16. The transfer tape according to claim 4 wherein said pressure-sensitive adhesive has been cured.

17. The transfer tape according to claim 5 wherein said pressure-sensitive adhesive has been cured.

18. The tape according to claim 6 wherein said pressure-sensitive adhesive has been cured.

19. The pressure-sensitive adhesive tape according to claim 1 wherein said pressure-sensitive adhesive further comprises at least one of a photo and thermal catalyst.

20. The transfer tape according to claim 4 wherein said pressure-sensitive adhesive further comprises at least one of a photo and thermal catalyst.

21. The transfer tape according to claim 5 wherein said pressure-sensitive adhesive further comprises at least one of a photo and thermal catalyst.

22. The tape according to claim 6 wherein said pressure-sensitive adhesive further comprises at least one of a photo and thermal catalyst.

23. The pressure-sensitive adhesive tape according to claim 1 wherein said pressure-sensitive adhesive further comprises a tackifier.

24. The transfer tape according to claim 4 wherein said pressure-sensitive adhesive further comprises a tackifier.

25. The transfer tape according to claim 5 wherein said pressure-sensitive adhesive further comprises a tackifier.

26. The tape according to claim 6 wherein said pressure-sensitive adhesive further comprises a tackifier.

27. The pressure-sensitive adhesive tape according to claim 1 comprising a layer of said pressure-sensitive adhesive on one surface of said backing and on the other surface a layer of a conventional pressure-sensitive adhesive.

* * * * *

UNITED STATES PATENT AND TRADEMARK OFFICE
CERTIFICATE OF CORRECTION

PATENT NO. : 5,266,399
DATED : Nov. 30, 1993
INVENTOR(S) : Gaddam N. Babu, et al It is certified that error appears in the above-indentified patent and that said Letters Patent is hereby corrected as shown below:

Col. 4, line 30     "having to" should read -- having 1 to --

Col. 8, line 34     "have to" should read -- have 5 to --

Col. 10, lines 18-18     delete "or "Shear at 70°C." (when measured at 70°C.)"

Col. 10, line 19     "after minutes." should read -- after 1000 minutes. --

Col. 22, lines 42-46,
Col. 23, lines 41-45,
Col. 24, lines 41-45
and
Col. 25, lines 46-50,

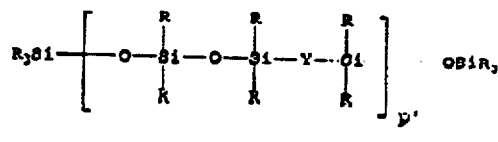

should read

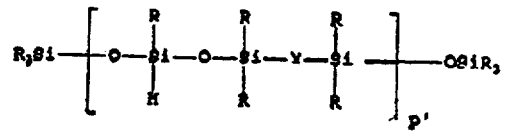

Signed and Sealed this

Sixth Day of September, 1994

Attest:

BRUCE LEHMAN

*Attesting Officer*     *Commissioner of Patents and Trademarks*